UNITED STATES PATENT OFFICE.

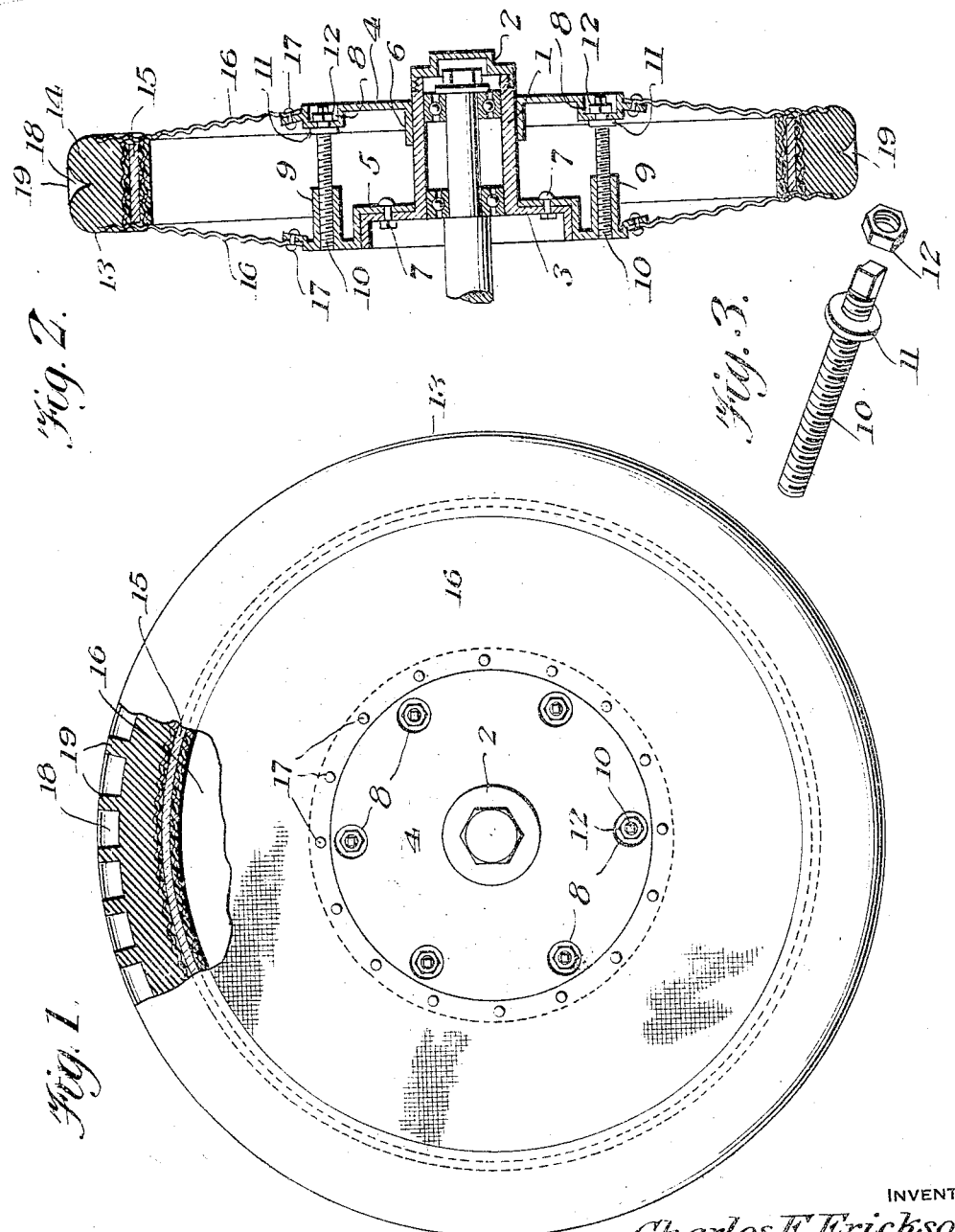

CHARLES F. ERICKSON, OF GREENWICH, CONNECTICUT.

VEHICLE-WHEEL.

1,251,358.   Specification of Letters Patent.   Patented Dec. 25, 1917.

Application filed February 27, 1917. Serial No. 151,285.

*To all whom it may concern:*

Be it known that I, CHARLES F. ERICKSON, a subject of the King of Sweden, residing at Greenwich, in the county of Fairfield and State of Connecticut, have invented new and useful Vehicle-Wheels, of which the following is a specification.

This invention relates to improvements in vehicle wheels and more particularly to the resilient non-pneumatic class of wheels.

One object of the present invention is to effect improvements in the construction of the tire and diaphragms by forming the diaphragms directly with the tire and so that the diaphragms are permanently connected to the tire.

Another object is to provide improved means for moving the disks relatively to each other to tension the diaphragms and to also strengthen and brace the wheel.

Another object is to effect improvements in the construction of the hub.

Another object is to effect improvements in the construction of the tire and to provide the same with non-skid devices.

With the above and other objects in view the invention consists in the construction, combination and arrangement of devices hereinafter described and claimed.

In the accompanying drawings:—

Figure 1 is an elevation partly in section of the wheel constructed and arranged in accordance with my invention.

Fig. 2 is a transverse sectional view of the same.

Fig. 3 is a detailed view of an adjusting bolt.

The hub 1 is adapted to be mounted on an axle in the usual way, is provided at the outer side with a cap 2 and is provided at the inner side with an outstanding annular flange 3 which is L-shaped in cross section.

A pair of disks 4, 5 are arranged on the hub, said disks in practice being made of steel or other suitable material. The outer disk 4 has a centrally arranged collar 6 through which the hub extends and said disk is mounted for movement on the hub toward and from the outer end thereof. The inner disk 5 is bolted as at 7 to the front side of the flange 3 and said disk is cross-sectionally angular as shown and fitted on said flange and is immovable.

The disk 4 has inwardly extending circular seats 8 at a suitable distance apart and the disk 5 is provided at points opposite said seats with inwardly extending interiorly threaded tubular portions 9. Adjusting bolts 10 connect the disks 4 and 5 and engage the threaded openings of the latter disk. Said bolts have stop flanges 11 which bear against the inner sides of the seats 8. The bolts pass through unthreaded openings in the seats so that said bolts are mounted in the seats for rotation and against longitudinal movement and each bolt has a lock nut 12 on its threaded outer end.

The tire 13 embodies a shoe 14 which may be made of rubber or of any other suitable material and the tire is also provided with a resilient rim or ring 15 which is embedded therein. Diaphragms 16 which are pliable and which may be made of the same fabric as the tire are formed integrally with the tire and are hence permanently united thereto and are arranged at the sides thereof. The diaphragms may be made of one or more pieces of material as desired. The diaphragms have their inner portions fitted in circumferential annular recesses in the disks and are securely fastened to the disks as by means of rivets 17 or other suitable devices.

By adjusting the outer disk toward or from the inner disk, which may be effected by first loosening the lock nuts 12 and then turning the bolts 10 in the required direction by a wrench, the diaphragms may be tensioned to any extent desired. The lock nuts when screwed in place effectually secure the bolts against casual turning and hence the desired tension of the diaphragms is maintained. The bolts also effectually brace the disks and diaphragms and serve to greatly strengthen the construction of the wheel without interfering with the resilience of the wheel. The diaphragms being flexible serve to absorb shocks received by the wheel and hence relieve the axle from excessive shocks and consequently also the vehicle carried by the axle. By permanently uniting the diaphragms to the tire the diaphragms are strengthened and moreover the cost of manufacture of the diaphragms and tire is lessened.

The shoe or outer portion of the tire is provided with an annular circumferential groove 18 and transversely arranged cross bars 19 which are here shown as integral, and which serve to prevent skidding.

While I have herein shown and described a preferred form of my invention I would have it understood that changes may be made in the form, proportion and construction of the several parts, without departing from the spirit of my invention and within the scope of the appended claims.

Having thus described my invention, what I claim is:—

1. In a vehicle wheel of the class described the combination of a hub having a flange, a disk secured to said flange, a disk mounted on the hub and movable toward and from the first-named disk, adjusting bolts connecting said disks at points without the hub, a tire, and diaphragms united to the sides of the tire and secured to and tensioned by said disks.

2. In a vehicle wheel of the class described, the combination of a hub, a pair of disks thereon arranged for relative movement, adjusting bolts connecting said disks, said bolts having threaded engagement with one of the disks and being rotatably connected to the other and against longitudinal movement therein, and being provided at said connected ends with lock nuts, a tire, and diaphragms united to and extending from the sides of the tire and secured to said disks.

3. In a vehicle wheel of the class described, the combination of a hub having an outwardly extending annular flange at its inner end, a disk around the hub, secured to said flange and provided at points without the hub with inwardly extending interiorly threaded tubular portions, an outer disk having a centrally arranged collar through which the hub extends, said outer disk being mounted for movement on the hub toward and from the inner disk and being provided with inwardly extending circular seats, a tire, diaphragms united to and extending from the sides of the tire and secured to the disks, and bolts connecting the disks and each engaging one of the tubular portions of the inner disks and being connected to one of the seats of the outer disk for rotation and against longitudinal movement, said bolts being provided with lock nuts to engage the outer sides of the seats.

In testimony whereof I affix my signature.

CHARLES F. ERICKSON.